United States Patent
Lee et al.

(10) Patent No.: US 10,648,826 B2
(45) Date of Patent: May 12, 2020

(54) PROVIDING STOP RECOMMENDATIONS BASED ON A TRAVEL PATH AND TRANSACTION DATA

(71) Applicant: MasterCard International Incorporated, Purchase, NY (US)

(72) Inventors: Edward M. Lee, Scarsdale, NY (US); Marianne Iannace, North Salem, NY (US)

(73) Assignee: Mastercard International Incorporated, Purchase, NY (US)

( * ) Notice: Subject to any disclaimer, the term of this patent is extended or adjusted under 35 U.S.C. 154(b) by 205 days.

(21) Appl. No.: 15/847,917

(22) Filed: Dec. 20, 2017

(65) Prior Publication Data

US 2019/0186934 A1    Jun. 20, 2019

(51) Int. Cl.
*G01C 21/34* (2006.01)
*G01C 21/20* (2006.01)
*G01C 21/36* (2006.01)

(52) U.S. Cl.
CPC .......... *G01C 21/3476* (2013.01); *G01C 21/20* (2013.01); *G01C 21/3484* (2013.01); *G01C 21/3617* (2013.01); *G01C 21/3679* (2013.01)

(58) Field of Classification Search
CPC ............. G01C 21/3476; G01C 21/20; G01C 21/3484; G01C 21/3617; G01C 21/3679
USPC ..................................................... 701/426
See application file for complete search history.

(56) References Cited

U.S. PATENT DOCUMENTS

| | | | |
|---|---|---|---|
| 6,434,482 B1 | 8/2002 | Oshida et al. | |
| 8,073,460 B1 | 12/2011 | Scofield et al. | |
| 8,229,458 B2 | 7/2012 | Busch et al. | |
| 8,433,512 B1 * | 4/2013 | Lopatenko | G01C 21/3679 701/400 |
| 8,983,973 B2 | 3/2015 | Englewood et al. | |
| 9,082,239 B2 * | 7/2015 | Ricci | H04W 4/44 |
| 9,696,174 B2 * | 7/2017 | Kim | G01C 21/3682 |
| 2014/0309921 A1 * | 10/2014 | Ricci | H04W 4/21 701/400 |

(Continued)

OTHER PUBLICATIONS

Xin, "MARS: A Multi-Aspect Recommender System for Point-of-Interest", ICDE Conference, Dec. 31, 2015, 4 pages.

(Continued)

*Primary Examiner* — Yazan A Soofi

(57) ABSTRACT

The disclosure facilitates the generation and provision of stop locations based on context data and transaction data associated with a user's account. Context data indicating a location and travel path of a user is collected from a computing device of the user and a plurality of stop locations are identified by a recommendation engine based on the context data. User transaction data associated with the user is received by the recommendation engine. User preference data is determined by the recommendation engine based on the transaction data. The recommendation engine provides a recommendation of at least one stop location based on the user preference data, whereby the user is enabled to select a stop location based on the recommendation. Generating recommendations based on the user's transaction data and context data provides reliable recommendations to the user and enhances the efficiency of the user's stops while traveling.

20 Claims, 6 Drawing Sheets

(56) References Cited

U.S. PATENT DOCUMENTS

| | | | |
|---|---|---|---|
| 2015/0032366 A1* | 1/2015 | Man | G08G 1/096741 |
| | | | 701/412 |
| 2016/0061617 A1 | 3/2016 | Duggan et al. | |
| 2016/0117781 A1 | 4/2016 | Lee et al. | |
| 2017/0169497 A1* | 6/2017 | Lee | G06Q 30/0631 |
| 2017/0219373 A1* | 8/2017 | DiMeo | G08G 1/0112 |
| 2019/0186934 A1* | 6/2019 | Lee | G01C 21/3476 |

OTHER PUBLICATIONS

Zhao, "A Survey of Point-of-interest Recommendation in Location-based Social Networks", Cornell University Library CoRR, Jul. 3, 2016, 30 pages.

Henry, "The Best Turn-By-Turn Navigation App for Android", Lifehacker, Jan. 10, 2013, 6 pages.

* cited by examiner

PROVIDING STOP RECOMMENDATIONS BASED ON A TRAVEL PATH AND TRANSACTION DATA

BACKGROUND

Current mapping applications provide users with a way to access directions, visualize a path of travel, and receive information about nearby businesses and/or points of interest while traveling. For instance, a mapping application on a user's mobile phone may provide a map showing the path to the user's destination as well as information regarding the user's next turn to follow the displayed travel path or the like. Further a user may be shown information associated with businesses (e.g., gas stations, restaurants, stores, etc.) that are nearby as they travel. However, even with the provided information, it can be challenging for users to select the places to stop along the travel path and maintain a balance of efficient travel (e.g., not detouring too far from the travel path to reach a stopping place, etc.) and stopping at locations the user prefers (e.g., a user may prefer a particular brand of restaurant or gas station, etc.). Mapping applications do not provide accurate, personalized recommendations for stop locations along the user's travel path, which may result in the user receiving unhelpful stop location recommendations and/or missing out on a stop location they would have preferred.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing stop location recommendations is described. The method comprises collecting, from a computing device of a user, context data indicating a location and travel path of the user and identifying, by a recommendation engine, a plurality of stop locations based on context data. User transaction data associated with the user is received by the recommendation engine. User preference data is determined by the recommendation engine based on the accessed transaction data. The user preference data indicates stop location preferences of the user. The recommendation engine provides a recommendation of at least one stop location of the identified plurality of stop locations based on the user preference data, whereby the user is enabled to select a stop location based on the recommended at least one stop location.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

The systems and methods described herein are configured to generate and provide recommendations of stop locations to a user while traveling based on the user's location, travel path, and transaction data associated with the user's account. Context data indicating a location and travel path of a user is collected from a computing device of the user and a plurality of stop locations are identified by a recommendation engine based on the context data. User transaction data associated with the user is received by the recommendation engine. User preference data is determined by the recommendation engine based on the transaction data. The recommendation engine provides a recommendation of at least one stop location based on the user preference data, whereby the user is enabled to select a stop location based on the recommendation. The disclosure enables the generation of stop location recommendations based on the specific user's behavioral patterns as identifiable from the transaction data of the user's account, enabling the generation of accurate recommendations tailored to the user.

The described disclosure improves the user experience of using a computer application to identify places to stop during a road trip. Because the recommendations are based on the user's transaction-based behavior, the recommendations are more accurate and/or better curated, resulting in a higher likelihood that the recommendations include a stop that the user will choose. This reduces the need for a computing device to generate large amounts of potential stop locations and reduces the need for the user to look through these potential stop locations and/or generic, inaccurate recommendations. The recommendation engine may also further streamline the process of choosing a stop location by providing additional data based on transaction data, such as whether a stop location is open, how busy a stop location is, and/or an estimated wait time at a stop location. As such, the described disclosure also improves the functioning of the computing device.

Figure 1:
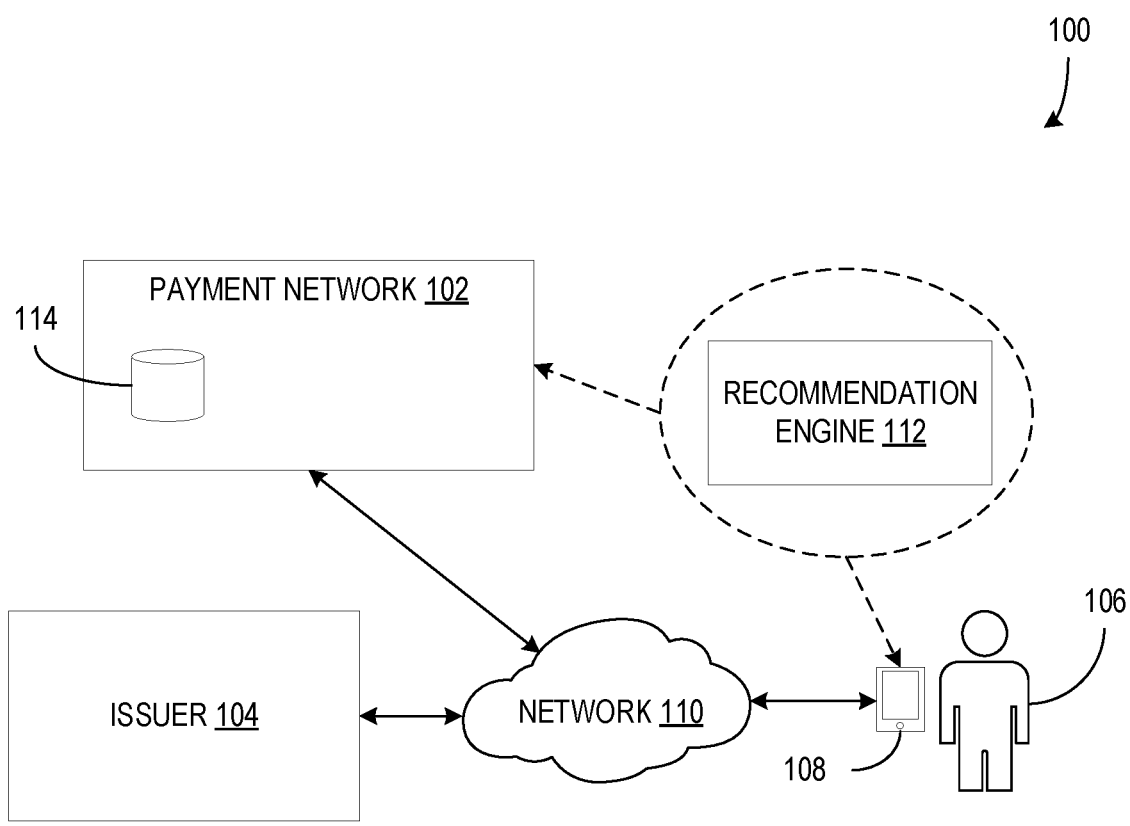
FIG. 1 is an exemplary block diagram illustrating a system configured for generating stop recommendations based on a travel path and transaction data according to an embodiment.

FIG. 1 is an exemplary block diagram illustrating a system 100 configured for generating stop recommendations based on a travel path and transaction data according to an embodiment. The system 100 includes a payment network 102, an issuer 104, and a user 106 with a computing device 108 connected to and/or in communication via a network 110. The payment network 102 (e.g., MASTERCARD®, etc.) is an entity that facilitates transactions, such as payments, between accounts (e.g., credit accounts, debit accounts, etc.). The issuer 104 is a bank or other financial entity that issues an account to the user 106. The payment network 102 facilitates transactions to and/or from the issued account of the user 106. The payment network 102 collects and records transaction data 114 associated with the facilitated transactions in one or more data stores on one or more server computing devices or the like.

The network 110 may include one or more sub networks of one or more types. For instance, the network 110 may include the Internet, a private intranet, and/or other networks. The network 110 may include any network organization or arrangement as understood by a person of ordinary skill in the art that enables the system 100 to provide the functionality described herein.

The user 106's computing device 108 (e.g., a mobile phone, tablet, laptop, personal computer, wearable computing device, etc.) includes one or more applications for interaction with the issuer 104 and/or the payment network 102 via the network 110. For instance, the user 106 may access account information on the computing device 108, such as account balance, monthly statements, account settings, and the like.

The recommendation engine 112 is a software module that is configured to generate stop recommendations based on a travel path of a user, collected by the computing device 108, in combination with transaction data 114, collected from the payment network 102, associated at least with the user's account as described below. In some examples, the recommendation engine 112 includes a processor configured to execute computer-executable instructions for performing the operations described herein.

The recommendation engine 112 or a portion thereof may be disposed and/or executed on the computing device 108 in the form of an application. Alternatively, or additionally, the recommendation engine 112 or a portion thereof may be located at the payment network 102 and executed on a server or other computing device associated therewith. For instance, the recommendation engine 112 may generate recommendations on a server device of the payment network 102 while providing input and/or output interface functionality on the computing device 108 of the user 106. In an alternative example, the recommendation engine 112 may be executed primarily on the computing device 108 while receiving transaction data from the payment network 102.

Figure 2:
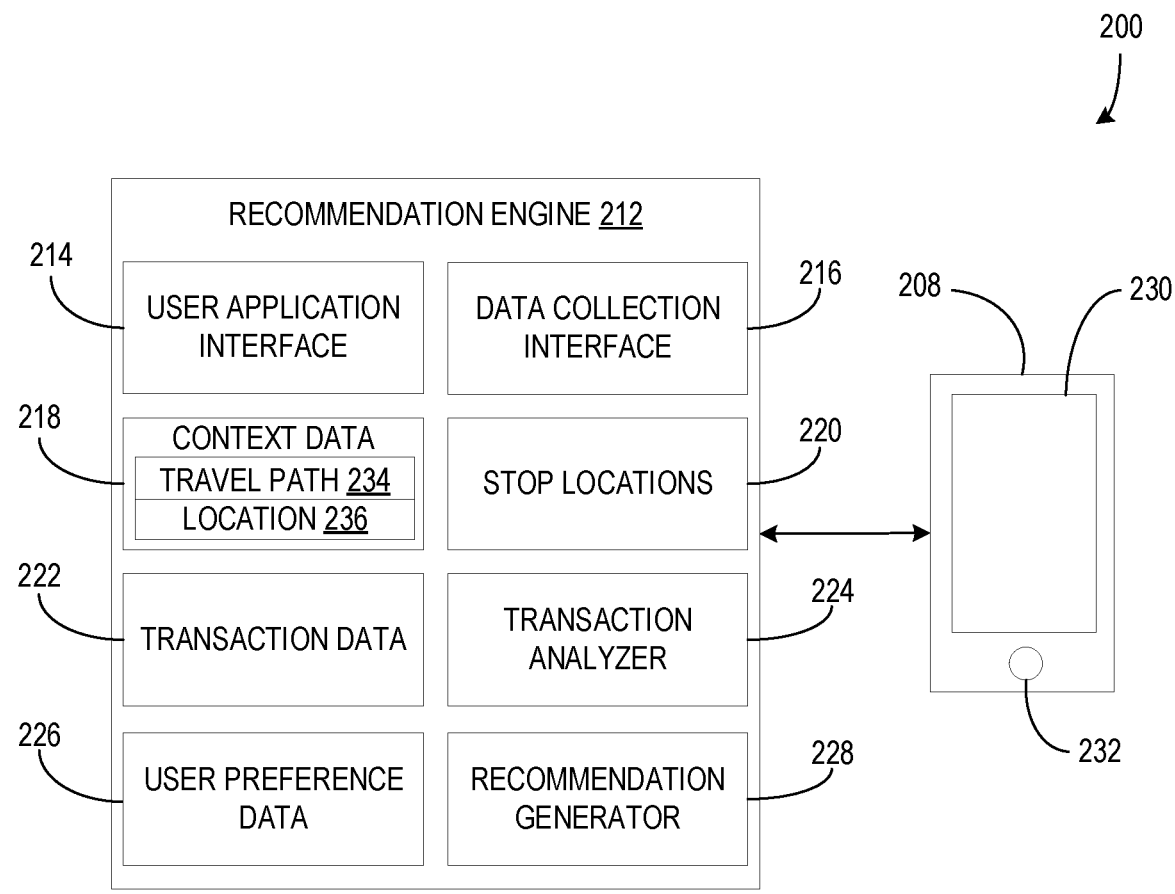
FIG. 2 is an exemplary block diagram illustrating a recommendation engine and an associated computing device according to an embodiment.

FIG. 2 is an exemplary block diagram 200 illustrating a recommendation engine 212 and an associated computing device 208 according to an embodiment. The recommendation engine 212 includes a user application interface 214 and a data collection interface 216. Further, it includes context data 218, stop locations 220 that may be identified by the recommendation engine 212, and transaction data 222 that may be collected by the recommendation engine 212. The transaction analyzer 224 of the recommendation engine 212 analyzes the transaction data 222 to generate user preference data 226. The recommendation generator 228 uses the user preference data 226 and the context data 218 to generate stop recommendations from the stop locations 220 for use by a user. The stop recommendations may be sent or otherwise transferred to a user interface 230 via the user application interface 214 for display to the user and the displayed stop recommendations may be interacted with via a user interface 232 (e.g., buttons, switches, etc.).

The user application interface 214 may include one or more software interface components or modules (e.g., application program interfaces (APIs), etc.) that are configured to receive input from and/or send output to a user application on the computing device 208. For instance, the user application interface 214 may be configured to receive information, such as user identity information (e.g., user name, password, account number, etc.), context data 218 (e.g., travel path data 234, location data 236, time data, etc.), and filter data (e.g., filter limitations from the user to apply to stop location recommendations, etc.). Further, the user application interface 214 may be configured to send information such as stop locations 220, recommendations thereof that have been generated by the recommendation generator 228, and recommendation reason data indicating factors that caused the recommendations to be made.

The data collection interface 216 may include one or more software interface components or modules (e.g., application program interfaces (APIs), etc.) that are configured to collect and/or receive data from data stores of the payment network, such as transaction data 222 collected from transaction data stores. Further, data associated with potential stop locations 220 may be collected via the data collection interface 216 from a stop location data store based on the location 236 of the context data 218 and/or other context data 218. A stop location data store may be associated with a mapping application of the computing device 208 and/or an associated mapping application server. Stop locations 220 may be collected from the stop location data store based on proximity to the location 236.

The context data 218, received from the user application interface 214, includes a travel path 234 and a location 236. It may also include time data, or other context data that may of use in identifying stop locations 220. For instance, the context data 218 may be obtained from sensors or components of the computing device 208, such as motion data from accelerometers and/or gyroscopes, location and/or direction data from a global positioning system (GPS) component and/or from cellular tower triangulation or the like, time data accessed from a clock component and/or from a network-accessed time server, etc. A travel path 234 may include a direction of travel, a rate of travel, a destination, and/or a set of way points between the current location 236 and a destination. The travel path 234 may track highways, streets, and/or roads as defined by a mapping application. The travel path 234 may also include time data, such as an estimated time of arrival at the destination, estimated times of arrival at waypoints along the defined travel path, etc. The current location 236 may be associated with the travel path 234. The location 236 may include data such as map coordinates, nearest address, or the like.

The stop locations 220 include data associated with merchants, rest stops, or other potential stop locations along the travel path. The stop locations 220 may include stop locations that are within a defined distance of the location 236 and/or of locations along the travel path 234. The stop locations 220 may further include data defining stop location categories (e.g., rest stops, gas stations, restaurants, stores, etc.), stop location identifiers (e.g., brand, store number, address, etc.), stop location account data (e.g., stop locations that are merchants may be associated with accounts through which purchases are transacted, etc.). In some examples, the user may request recommendations for regions other than the current location 236 and, as a result, the stop locations 220 include locations within a defined distance of the travel path 234 in the requested region. For instance, a user may request stop recommendations for 50 miles further down the travel path 234. The stop locations 220 identified by the recommendation engine 212 would then include stop locations within a defined distance of the travel path 234 at a point that is 50 miles down the travel path 234 from the current location 236. Alternatively, or additionally, the user may request recommendations for 1 hour in the future. In that case, the recommendation engine 212 may estimate a travel path 234 location at which the user will be in 1 hour and identify stop locations 220 that are within a defined distance of the estimated travel path 234 location. Further, the user may provide a specific time or range of times at which they would like recommendations (e.g., at 3:00 PM, between 11:00 AM and 1:00 PM, etc.) and the recommendation engine 212 identifies stop locations 220 that are estimated to correspond to the specific time or range of times.

The transaction data 222 includes transactions associated with the user's account and/or with the accounts of stop locations 220. Transaction data 222 includes data identifying the parties of a transaction, a date and time of a transaction, an amount of a transaction, a location of a transaction, and/or a type or category of a transaction. Other transaction data points may also be included. In some examples, transaction data 222 may include a subset of total transactions. For instance, the transactions may be within a sliding time window or windows (e.g., within the past six months, from the last defined trip time period, only transactions from non-local trips, etc.) or otherwise limited based on user input or defined rules. Transaction data 222 is further analyzed as described below with respect to the transaction analyzer 224.

The transaction analyzer 224 is a software component of the recommendation engine 212 that is configured to analyze the transaction data 222 to determine user preference data 226. The analyzed transaction data 222 is transaction data associated with an account of the user. The transaction analyzer 224 identifies user transaction activity patterns and determines user preferences therefrom. User preference data 226 may include preferred brand of stop location, a preferred category of stop location, preferred time periods for stopping at a stop location, preferred regions for stopping at a stop location, or the like. For instance, user transaction data may indicate that the user purchases gas from a first brand of gas station more often than any other brand of gas station. This pattern may indicate a user preference for the first brand of gas station. The identified user preference may result in recommendation of the first brand of gas station as described herein.

Other more complex user preferences may be determined by the transaction analyzer 224. In some examples, user preferences may be based on category of stop locations (e.g., type of restaurant cuisine, amount typically spent at restaurants, time of day of restaurant visits, etc.). For instance, a user transaction pattern may be identified that indicates the user stops at restaurants between 11 AM and 1 PM on most days of travel. Further, the stops are usually at hamburger restaurants that are inexpensive (e.g., less than $10 per transaction, etc.). User preferences based on these factors are determined and may be later used in generating stop location recommendations.

The user preference data 226 includes preference factor weights that are associated with preference factors identified by the transaction analyzer 224. The user preference data 226 may also include factor weight conditions, requirements, and/or rules that determine when and/or how a factor weight is applied in determining recommendations. For instance, the transaction data 222 may indicate a user has a strong preference for a first brand of fast food restaurant when traveling. As a result, the user preference data 226 may include a preference factor weight of 8, out of a maximum of 10, associated with the first brand of fast food restaurant. Alternatively, or additionally, the preference factor weight of the first brand may include a condition requiring that the time be within a defined lunch time period (e.g., 11 AM to 1 PM, etc.) in order to apply the preference factor weight. The preference factor weight associated with the first brand of fast food restaurant may only be applied to stop locations 220 when the condition is satisfied. Other combinations of preference factor weights and conditions may be determined based on users' transaction data 222.

In some examples, user preference data 226 may also be based on preferences provided by a user to the recommendation engine 212 via the user application interface 214. The provided preferences may be transformed into preference factor weights and/or conditions and applied in combination with other preference factor weights and/or conditions derived from the transaction data 222. For instance, a user may indicate a preference for Italian cuisine and, as a result, a preference factor weight associated with Italian cuisine may be applied to stop locations that include Italian restaurants.

The recommendation generator 228 is a software component of the recommendation engine 212 that applies user preference data 226 to the stop locations 220 to generate stop location recommendations. The stop locations 220 used by the recommendation generator 228 may be a subset of possible stop locations that are within a proximity of the location 236 or other locations along the travel path 234. The proximity may be based on distance from the travel path 234 by road (e.g., within one mile of the travel path, etc.) and/or an estimated time required to reach the stop location and return to the travel path 234 after the stop (e.g., stop locations that require 10 minutes or less additional travel time, etc.). For instance, a stop location may be close to the travel path in distance, but may require substantial time to reach due to having to travel on exit ramps, frontage roads, or the like. The additional time to reach a stop location is a factor when determining the subset of possible stop locations to be used by the recommendation generator 228.

The user preference data 226, including preference factor weights and conditions, are applied to the subset of possible stop locations 220. The comparative proximity of possible stop locations 220 to the travel path 234 may also be factored in to the weights applied to the stop locations 220. A possible stop location 220 may have a variety of weight factors applied to arrive at a total weight for the stop location 220. For instance, a total weight of 16 for a stop location 220 may include a brand factor weight of 5 (e.g., the user frequents stops of the brand of the stop location, etc.), a stop type factor weight of 3 (e.g., a lower weight may be applied because the user may be less likely to want to stop at a restaurant stop outside of meal times, etc.), and a proximity factor weight of 8 (e.g., the stop location is very close to the travel path 234, etc.).

In some examples, factor weights are also determined from transaction data associated with accounts of the stop locations. For instance, transaction data associated with stop locations may be used to determine stop location operating data such as the open hours of a stop location, an estimated wait time at a stop location, when the stop location is busy, etc. The stop location transaction factor weights may be included in the total weight of a stop location and/or may cause stop locations to be filtered out. For example, if the stop location transaction data indicates that a stop location is closed, the stop location may be filtered out from possible stop locations. Alternatively, or additionally, additional factor weight may be added to a stop location's total weight when it is determined that the wait time at the stop location is short.

Further, total weights of stop locations 220 may be adjusted by the recommendation generator 228 based on proximity to other stop locations. For instance, if two stop locations with relatively high total weights (e.g., total weights over a threshold of 10, 15, 20, etc.) are within a defined distance and/or travel time of each other (e.g., within 200 meters, within 2 minutes travel time, etc.), the total weights of the two stop locations may be adjusted by a flat amount or by a percentage amount (e.g., increased by 2, increased by 10%, etc.) to reflect that the user may prefer to stop at both stop locations in a single stop. This proximity adjustment may only be applied to stop locations that have different types, such as a restaurant and a gas station, rather than stop locations that have the same type, such as two gas stations; the user may want to stop for both food and gas, but is unlikely to purchase gas at two different gas stations in one stop.

Preference factor weights are applied to all the subset of possible stop locations 220 and the stop location or stop locations with the highest total weights may be included in a generated recommendation. In some examples, the single highest weighted stop location is provided as a recommendation via the recommendation generator 228. Alternatively, a defined number of the highest weighted stop locations may be provided as a recommendation (e.g., the top three, top five, or top ten stop locations may be provided, etc.). In another alternative example, a percentage of the highest weighted stop locations may be provided as a recommendation (e.g., the top 10%, top 25%, or top 33% of the stop locations may be provided, etc.).

In some examples, providing the recommendation includes causing the recommendation to be provided to the computing device 208 and/or displayed on the screen interface 230 of the computing device 208. Further, a user application of the computing device 208 may be configured to enable a user to interact with the provided recommendation by a user interface 232 (e.g., to select a recommended stop location, confirm the recommendation, decline the recommendation, provide filter data of for filtering the recommendation, etc.).

Figure 3:
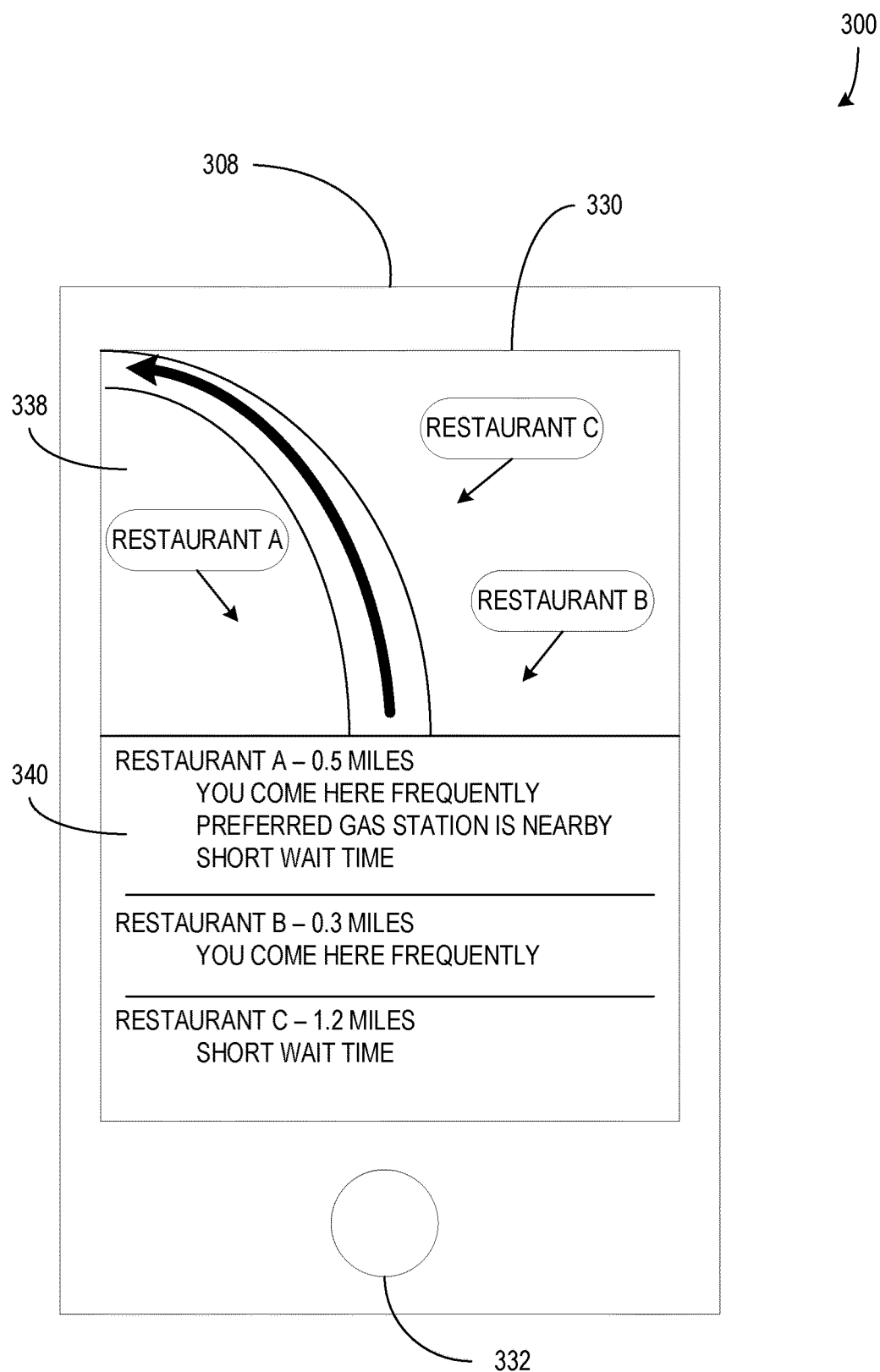
FIG. 3 is an exemplary diagram illustrating a graphical user interface (GUI) associated with stop recommendations displayed on a screen of a computing device according to an embodiment.

FIG. 3 is an exemplary diagram 300 illustrating a graphical user interface (GUI) (interfaces 338 and 340) associated with stop recommendations displayed on a screen 330 of a computing device 308 according to an embodiment. The screen interface 330 displays a map interface 338 and a list interface 340. The map interface 338 display a travel path in the form of an arrow extending along a road on the map. Recommended stop locations, Restaurant A, Restaurant B, and Restaurant C, are shown at points on the map relative to the displayed road. The map interface 338 enables a user to visualize the locations of recommended stop locations.

The list interface 340 includes the three recommended stop locations in a ranked list with additional information. Each list entry is associated with one recommended stop location and provides a distance to the recommended stop location as well as factors that caused the associated stop location to be recommended. For instance, Restaurant A is 0.5 miles from the travel path and it is recommended because the user goes to the restaurant frequently, a gas station preferred by the user is nearby, and there is likely to be a short wait time. Restaurants B and C are not recommended as highly as Restaurant A. While Restaurant B is closer than Restaurant A, it does not include preference factor weight for proximity to a preferred gas station or the short wait time. Further, Restaurant C has a short wait time, but is farther from the travel path and, therefore, not recommended as highly as Restaurant A or Restaurant B. The user may select one of the recommended stop locations and the mapping application may provide directions to the selected stop location.

In some examples, the user may also apply filters to the results based on the applicable factors (e.g., selecting to ignore restaurant-specific factors when food is not desired, etc.).

Figure 4:
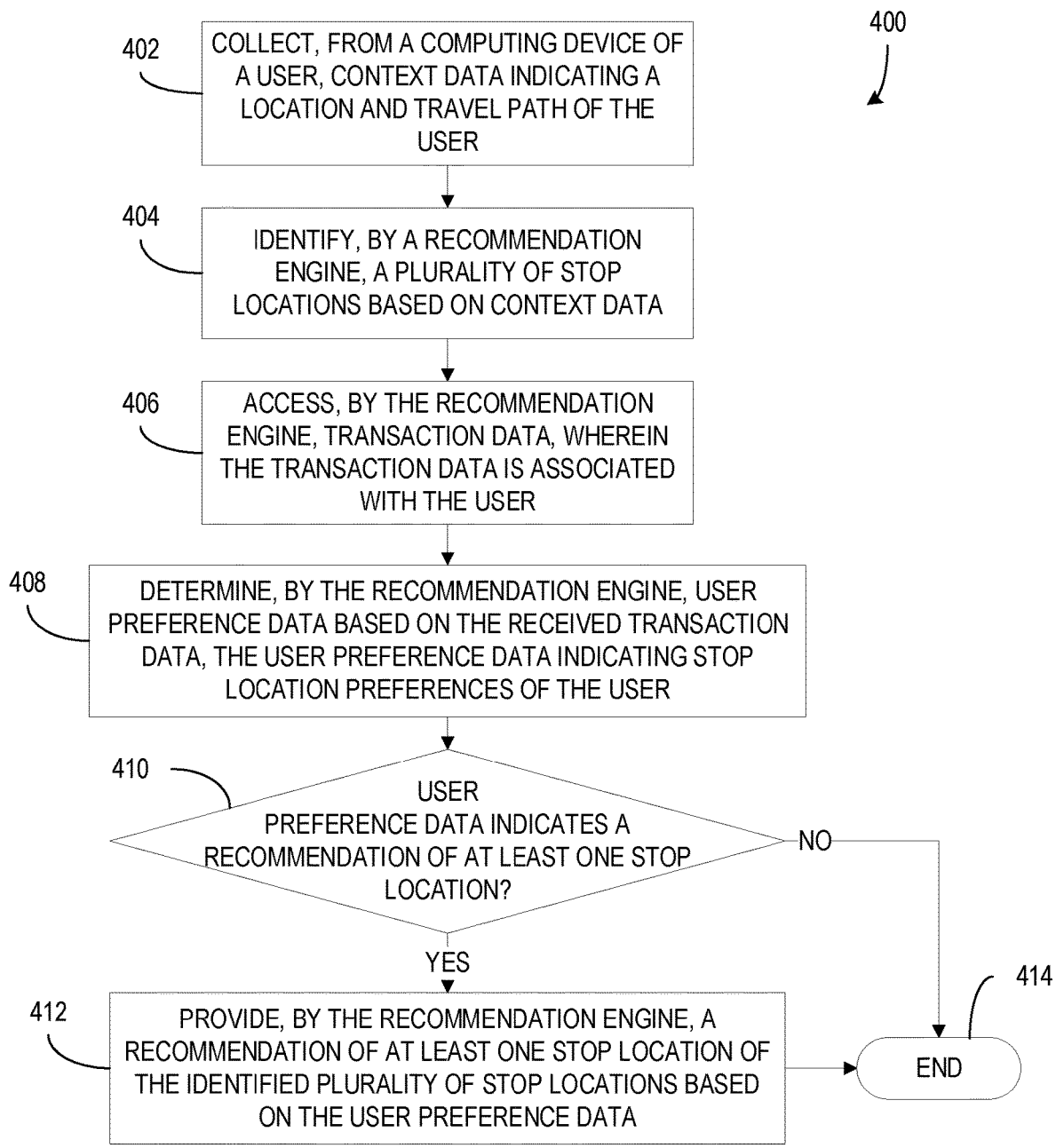
FIG. 4 is an exemplary flow chart illustrating generating and providing stop recommendations based on a travel path and transaction data according to an embodiment.

FIG. 4 is an exemplary flow chart 400 illustrating generating and providing stop recommendations based on a travel path and transaction data according to an embodiment. The described steps of the flow chart 400 may be performed on a mobile computing device (e.g., computing device 208, etc.). Further, portions of the flow chart 400 may be performed in the cloud, on a server computing device, or the like. At 402, context data indicating a location and travel path of a user is collected from a computing device of the user. The data may be collected by an application on the computing device of the user and provided to a recommendation engine on the user's computing device or over a network to a different computing device on which the recommendation engine is installed and/or executed.

At 404, a plurality of stop locations are identified by the recommendation engine based on the context data. Stop locations include gas stations, rest stops, restaurants, stores, and/or other types of stops. In some examples, the identified stop locations are within a defined distance and/or a defined travel time of the current location of the user as indicated by the context data. Alternatively, or additionally, the identified stop locations may be with in a defined distance and/or a defined travel time of a different location further down the travel path (e.g., 50 miles down the travel path, 1 hour down the travel path, etc.) as described herein.

At 406, transaction data is accessed by the recommendation engine. The transaction data is associated with the user. The transaction data may further be associated with accounts of some or all of the identified stop locations. In some examples, the transaction data includes identifiers of parties to transactions, amounts of transactions, types and/or categories of transactions, date and time of transactions, etc. At 408, the recommendation engine determines user preference data based on the accessed transaction data. The user preference data indicates stop location preferences of the user. In some examples, the user preference data indicates user preferences based on brands of the stop locations, categories of the stop locations, location of the stop locations, an average amount spent of the stop locations, etc. The user preferences may be determined based on patterns of user behavior that are identified through analysis of the user's transaction data. The analyzed transaction data may include all of the transaction data associated with the user's account or a subset of the transaction data associated with the user's account, such as the transaction data associated with transactions from a defined time period (e.g., the last six months, the last two years, etc.).

At 410, the recommendation engine determines if the user preference data, when applied to the identified stop locations, indicates a recommendation of at least one of the stop locations. If so, at 412, the recommendation engine provides a recommendation of at least one stop location of the identified plurality of stop locations based on the user preference data. A recommendation may be indicated when a stop location sufficiently matches the user preference data. For instance, a stop location matching user preference factors as described herein may result in preference factor weights being added to the stop location. If the total weight of the stop location exceeds a defined threshold (e.g., greater than or equal to 10 total weight, etc.), a recommendation of the stop location is indicated. The provided recommendation may include one or more of the identified stop locations (e.g., the stop location with the highest total weight, the top three stop locations by total weight, the top 10% of stop locations by total weight, etc.).

If a recommendation is not indicated at 410 or after the recommendation is provided at 412, the process ends at 414.

Figure 5:
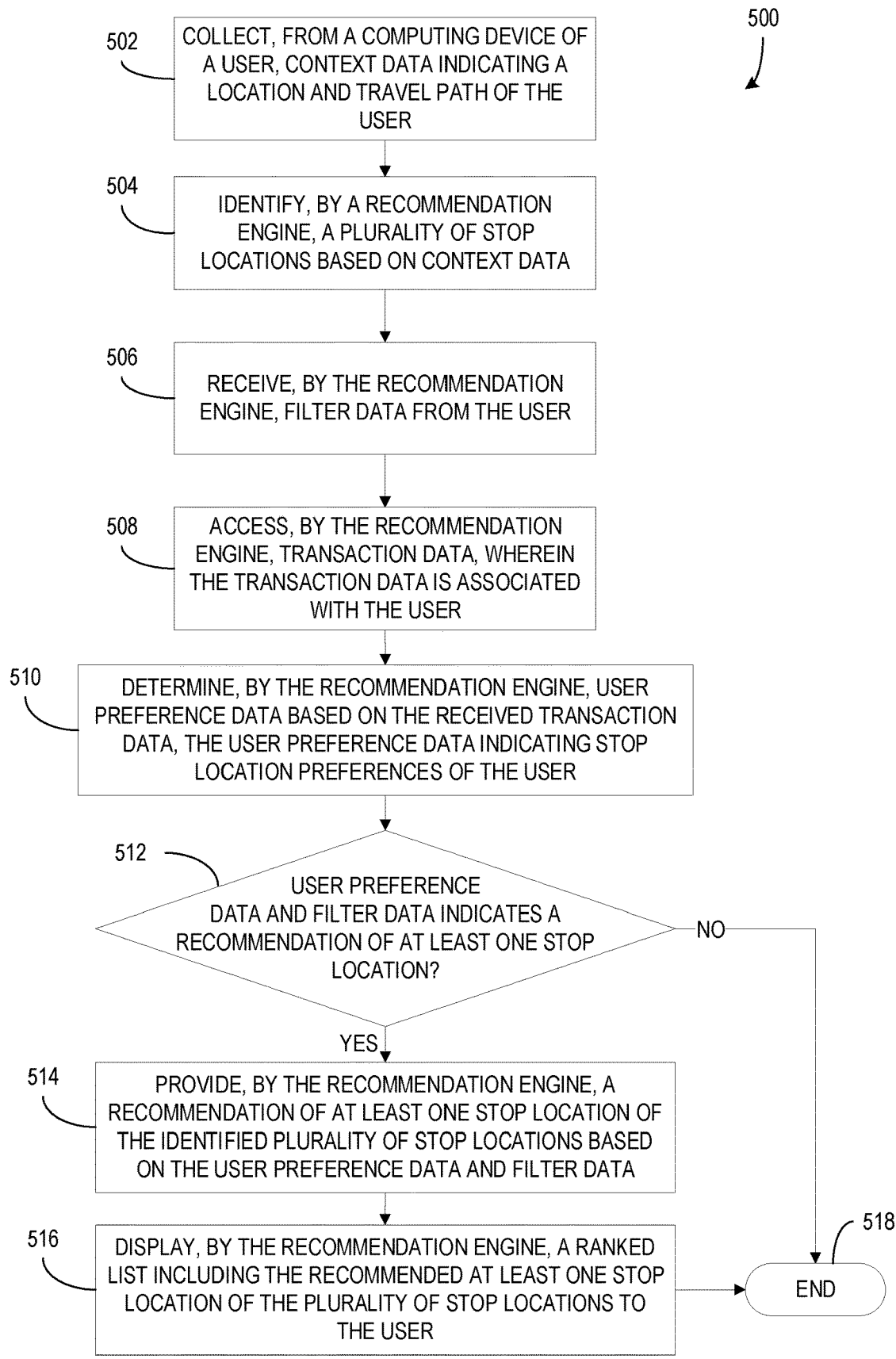
FIG. 5 is an exemplary flow chart illustrating the process of FIG. 4, further including filtering the stop recommendations based on received filter data and displaying the stop recommendations in a ranked list according to an embodiment.

FIG. 5 is an exemplary flow chart 500 illustrating the process of FIG. 4, further including filtering the stop recommendations based on received filter data and displaying the stop recommendations in a ranked list according to an embodiment. From 502-504, the context data is collected and the stop locations are identified as described above with respect to FIG. 4. At 506, the recommendation engine receives filter data from the user. The filter data may include filter limitations that indicate the user's specific preferences for recommendations, such as specific types of stop locations (e.g., only gas stations, etc.), specific average amount spent at stop locations (e.g., only restaurants with less than $20 spent on average, etc.), keywords associated with stop locations (e.g., only stop locations that include a provided keyword in their name, description, or other data, etc.), time periods that stop locations are open, or the like. Provided filter data enables the user to pare down the potential recommended stop locations based on specific limitations.

At 508 and 510, the recommendation engine accesses transaction data associated with the user and determines user preference data based on the accessed transaction data as described above with respect to FIG. 4. At 512, the recommendation engine determines whether a recommendation of at least one stop location is indicated by applying the user preference data to the identified stop locations as described above. Additionally, the recommendation engine applies the filter data received from the user to the stop locations, thereby limiting the recommendation to stop locations that fit the received filter limitations.

If a recommendation is indicated at 512, the recommendation of at least one stop location of the identified plurality of stop locations is provided by the recommendation engine. In some examples, the recommendation is provided to an application of the user's computing device. At 516, the recommendation is displayed to the user as a ranked list including the recommended at least one stop location of the plurality of stop locations. For instance, a ranked list may be displayed to the user on a screen interface of a computing device as shown in FIG. 3. The ranked list may include all of the stop locations for which a recommendation is indicated in order of total weights or the ranked list may include only a defined number of stop locations or a defined percentage of stop locations in the ranked order.

If a recommendation is not indicated at 512, the process ends at 518.

Additional Example Scenarios

Aspects of the disclosure enable various additional scenarios, such as next described.

In an example, a user travels toward a destination on a road. The user's computing device includes a mapping application that provides a GPS-based location and a travel path as the user travels. The mapping application provides the location and travel path data, as well as potential stop location data, to a recommendation engine on the user's computing device. The user has previously registered a credit card account with the recommendation engine. The recommendation engine accesses transaction data associated with the credit card account by requesting the transaction data from the payment network with which the credit card account is associated. Upon accessing the transaction data, the recommendation engine determines that the user's preferences include a preference for stopping for gas at Brand A gas stations. The recommendation engine applies the preference to the potential stop locations in the provided stop location data to identify nearby gas stations of Brand A. Upon identifying a Brand A gas station within one mile of the user's location and in front of the user based on the travel path, the recommendation engine provides a recommendation of the identified Brand A gas station to the user. The recommended gas station is added to the interface of the mapping application of the user's computing device and the user is provided the option of diverting the travel path to include a stop at the gas station. The user confirms the stop and the gas station is added to the travel path of the user.

In another example, the user requests recommendations for restaurants over the next hour of travel. The recommendation engine identifies a set of potential restaurants that are located within one mile of the travel path and are reachable within one hour based on the user's current rate of travel. The set of potential restaurants includes 10 restaurants. The user's request includes a filter limitation that requires the restaurants to have an estimated wait time of 15 minutes or less. The recommendation engine accesses transaction data associated with the user's credit card account and transaction data associated with the accounts of the 10 identified restaurants. Analysis of the restaurants' account transaction data indicates an estimated wait time of greater than 15 minutes for five of the 10 identified restaurants. Of the remaining five restaurants, the recommendation engine identifies the three restaurants that most accurately match the determined user preferences for burgers and average amount spent of less than 10 dollars. The identified three restaurants are provided as a recommendation of stop locations for the user over the next hour of travel. The three restaurants are displayed to the user in a ranked list based on the total weight of each restaurant as described herein.

In another example, the user indicates to the recommendation engine that a stop for gas will be needed in 50 miles. The recommendation engine identifies potential gas stations between the user's current location and 50 miles down the travel path of the user as described herein. The recommendation engine determines, based on the user's transaction data, that the user frequently stops at gas stations of Brand A. Further, the recommendation determines that the user tends to purchase food around the current time, and that the user frequently purchases food from deli restaurants. The recommendation engine applies the user's preferences to the identified potential gas stations and determines that there are two gas stations of Brand A within the identified region and the first of the two Brand A gas stations is within 100 meters of a deli restaurant. The recommendation engine provides the two Brand A gas stations to the user as a recommendation and includes the first gas station as the first item on a ranked recommendation list based on the proximity to the deli restaurant. The ranked recommendation list is displayed to the user and the item associated with the first gas station informs the user that the deli restaurant will be nearby, enabling the user to efficiently purchase gas and food if desired.

Exemplary Operating Environment

Figure 6:
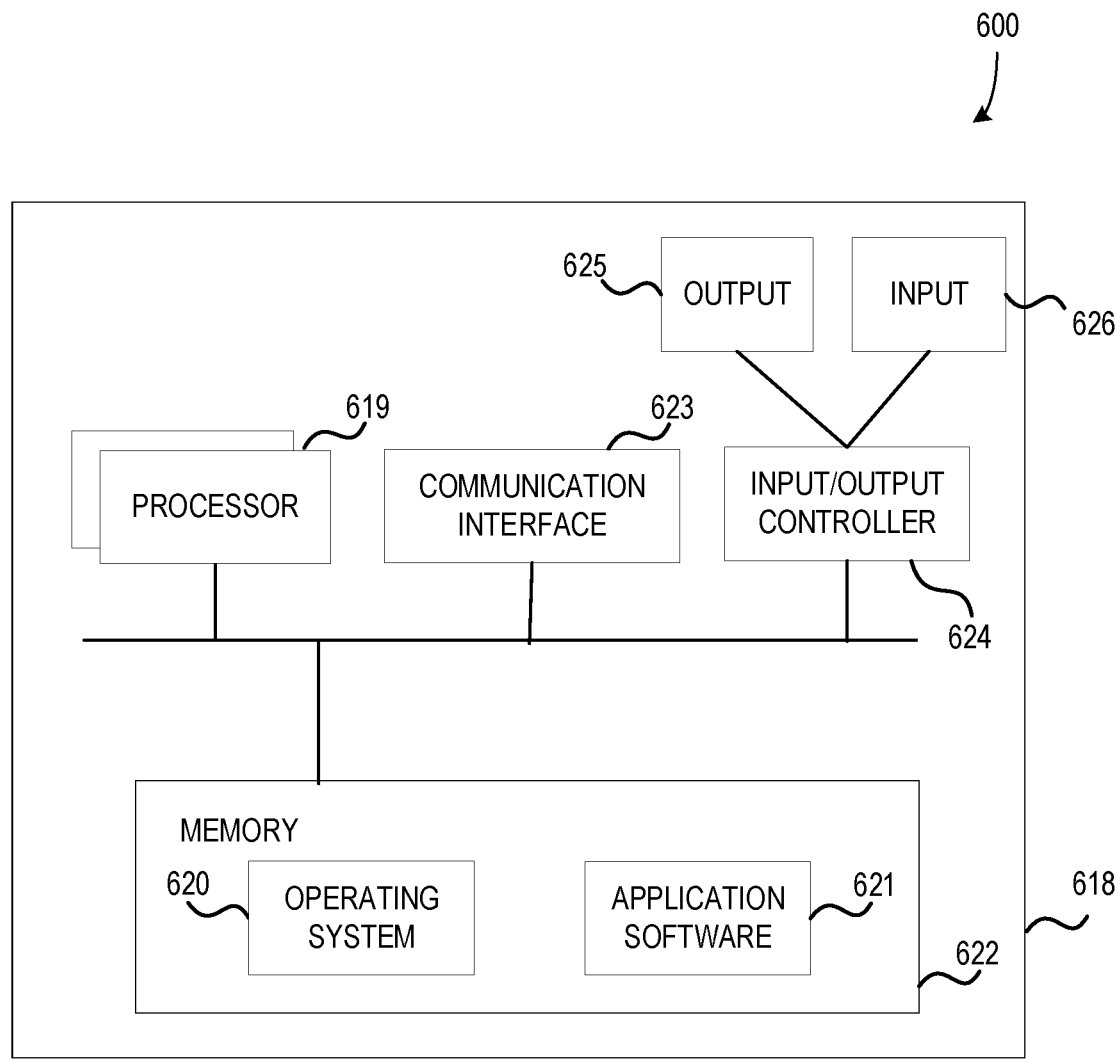
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, collecting context data and transaction data associated with a user's account and generating stop location recommendations based on the collected data as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for providing stop location recommendations, the system comprising:
  at least one processor;
  at least one memory comprising computer program code, the at least one memory and computer program code configured to, with the at least one processor, cause the at least one processor to:
    collect, from a computing device of a user, context data indicating a location and travel path of the user;
    identify, by a recommendation engine, a plurality of stop locations based on context data;
    access, by the recommendation engine, transaction data, wherein the transaction data is associated with the user;
    determine, by the recommendation engine, user preference data based on the accessed transaction data, the user preference data indicating stop location preferences of the user; and
    provide, by the recommendation engine, a recommendation of at least one stop location of the identified plurality of stop locations based on the user preference data, whereby the user is enabled to select a stop location based on the recommended at least one stop location.

The system described above, wherein the user preference data indicates at least one of a preferred brand of stop location, a preferred category of stop location, a preferred time period for stopping at a stop location, and a preferred region for stopping at a stop location.

The system described above, wherein the accessed transaction data further includes transaction data associated with the plurality of stop locations; and
  wherein providing a recommendation of at least one stop location of the plurality of stop locations includes providing a recommendation of at least one stop location based further on the transaction data associated with the plurality of stop locations.

The system described above, the at least one memory and computer program code configured to, with the at least one processor, further cause the at least one processor to determine, based on the transaction data associated with the plurality of stop locations, stop location operating data including at least one of open hours data of the plurality of stop locations, predicted busy time period data of the plurality of stop locations, or predicted wait time data of the plurality of stop locations; and
  wherein providing a recommendation of at least one stop location includes providing a recommendation of at least one stop location further based on the determined stop location operating data.

The system described above, wherein the context data includes a travel path mapped to a destination location; and
  wherein identifying the plurality of stop locations includes identifying stop locations that are within a defined distance of the travel path.

The system described above, the at least one memory and computer program code configured to, with the at least one processor, further cause the at least one processor to receive stop timing data from the user, the stop timing data indicating a time period during which the user wants to stop; and
  wherein identifying the plurality of stop locations includes identifying stop locations that are predicted to be reachable within the indicated time period based on the context data and the stop timing data.

The system described above, wherein the recommendation of at least one stop location includes a ranked list of three stop locations of the identified plurality of stop locations.

The system described above, the at least one memory and computer program code configured to, with the at least one processor, further cause the at least one processor to receive filter data from the user; and
  wherein providing a recommendation of at least one stop location of the identified plurality of stop locations includes filtering the identified plurality of stop locations based on the received filter data.

The system described above, wherein the filter data includes at least one of a category of stop location, a brand of stop location, open hours of stop locations, and a keyword associated with stop locations.

A computerized method for providing stop location recommendations comprising:
  collecting, from a computing device of a user, context data indicating a location and travel path of the user;
  identifying, by a recommendation engine, a plurality of stop locations based on context data;
  accessing, by the recommendation engine, user transaction data associated with the user;
  determining, by the recommendation engine, user preference data based on the accessed transaction data, the user preference data indicating stop location preferences of the user; and
  providing, by the recommendation engine, a recommendation of at least one stop location of the identified plurality of stop locations based on the user preference data, whereby the user is enabled to select a stop location based on the recommended at least one stop location.

The computerized method described above, wherein the user preference data indicates at least one of a preferred brand of stop location, a preferred category of stop location, a preferred time period for stopping at a stop location, and a preferred region for stopping at a stop location.

The computerized method described above, wherein the accessed transaction data further includes transaction data associated with the plurality of stop locations; and
  wherein providing a recommendation of at least one stop location of the plurality of stop locations includes providing a recommendation of at least one stop location based further on the transaction data associated with the plurality of stop locations.

The computerized method described above, further comprising determining, based on the transaction data associated with the plurality of stop locations, stop location operating data including at least one of open hours data of the plurality of stop locations, predicted busy time period data of the plurality of stop locations, or predicted wait time data of the plurality of stop locations; and
  wherein providing a recommendation of at least one stop location includes providing a recommendation of at least one stop location further based on the determined stop location operating data.

The computerized method described above, wherein the context data includes a travel path mapped to a destination location; and
  wherein identifying the plurality of stop locations includes identifying stop locations that are within a defined distance of the travel path.

The computerized method described above, the at least one memory and computer program code configured to, with the at least one processor, further cause the at least one processor to receive stop timing data from the user, the stop timing data indicating a time period during which the user wants to stop; and
  wherein identifying the plurality of stop locations includes identifying stop locations that are predicted to be reachable within the indicated time period based on the context data and the stop timing data.

One or more computer storage media having computer-executable instructions for providing stop location recommendations that, upon execution by a processor, cause the processor to at least:

collect, from a computing device of a user, context data indicating a location and travel path of the user;

identify, by a recommendation engine, a plurality of stop locations based on context data;

access, by the recommendation engine, user transaction data associated with the user;

determine, by the recommendation engine, user preference data based on the accessed transaction data, the user preference data indicating stop location preferences of the user; and provide, by the recommendation engine, a recommendation of at least one stop location of the identified plurality of stop locations based on the user preference data, whereby the user is enabled to select a stop location based on the recommended at least one stop location.

The one or more computer storage media described above, wherein the user preference data indicates at least one of a preferred brand of stop location, a preferred category of stop location, a preferred time period for stopping at a stop location, and a preferred region for stopping at a stop location.

The one or more computer storage media described above, wherein the accessed transaction data further includes transaction data associated with the plurality of stop locations; and wherein providing a recommendation of at least one stop location of the plurality of stop locations includes providing a recommendation of at least one stop location based further on the transaction data associated with the plurality of stop locations.

The one or more computer storage media described above, the computer-executable instructions, upon execution by a processor, further causing the processor to determine, based on the transaction data associated with the plurality of stop locations, stop location operating data including at least one of open hours data of the plurality of stop locations, predicted busy time period data of the plurality of stop locations, or predicted wait time data of the plurality of stop locations; and wherein providing a recommendation of at least one stop location includes providing a recommendation of at least one stop location further based on the determined stop location operating data.

The one or more computer storage media described above, wherein the context data includes a travel path mapped to a destination location; and wherein identifying the plurality of stop locations includes identifying stop locations that are within a defined distance of the travel path.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for collecting context data and transaction data associated with a user's account and generating stop location recommendations based on the collected data. The illustrated one or more processors 619 together with the computer program code stored in memory 622 constitute exemplary processing means for analyzing transaction data to determine user preferences and apply the determined user preferences to potential stop locations to generate and provide stop location recommendations.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing stop location recommendations, the system comprising:
   at least one processor;
   at least one memory comprising computer program code, the at least one memory and computer program code configured to, with the at least one processor, cause the at least one processor to:
   collect, from a computing device of a user, context data indicating a location and travel path of the user;

identify, by a recommendation engine, a plurality of stop locations based on context data;

access, by the recommendation engine, transaction data, wherein the transaction data is associated with one or more past financial transactions of the user, the past financial transactions being conducted using a payment card;

determine, by the recommendation engine, user preference data based on the accessed transaction data, the user preference data indicating stop location preferences of the user;

provide, by the recommendation engine, a recommendation of at least one stop location of the identified plurality of stop locations based on the user preference data; and provide guidance including a travel path and a distance from the location of the user to the stop location thereby enabling the user to reach the stop location following the provided guidance.

2. The system of claim 1, wherein the user preference data indicates at least one of a preferred brand of stop location, a preferred category of stop location, a preferred time period for stopping at a stop location, and a preferred region for stopping at a stop location.

3. The system of claim 1, wherein the accessed transaction data further includes transaction data associated with the plurality of stop locations; and
wherein providing a recommendation of at least one stop location of the plurality of stop locations includes providing a recommendation of at least one stop location based further on the transaction data associated with the plurality of stop locations.

4. The system of claim 3, the at least one memory and computer program code configured to, with the at least one processor, further cause the at least one processor to determine, based on the transaction data associated with the plurality of stop locations, stop location operating data including at least one of open hours data of the plurality of stop locations, predicted busy time period data of the plurality of stop locations, or predicted wait time data of the plurality of stop locations; and
wherein providing a recommendation of at least one stop location includes providing a recommendation of at least one stop location further based on the determined stop location operating data.

5. The system of claim 1, wherein the context data includes a travel path mapped to a destination location; and
wherein identifying the plurality of stop locations includes identifying stop locations that are within a defined distance of the travel path.

6. The system of claim 5, the at least one memory and computer program code configured to, with the at least one processor, further cause the at least one processor to receive stop timing data from the user, the stop timing data indicating a time period during which the user wants to stop; and
wherein identifying the plurality of stop locations includes identifying stop locations that are predicted to be reachable within the indicated time period based on the context data and the stop timing data.

7. The system of claim 1, wherein the recommendation of at least one stop location includes a ranked list of three stop locations of the identified plurality of stop locations.

8. The system of claim 1, the at least one memory and computer program code configured to, with the at least one processor, further cause the at least one processor to receive filter data from the user; and wherein providing a recommendation of at least one stop location of the identified plurality of stop locations includes filtering the identified plurality of stop locations based on the received filter data.

9. The system of claim 8, wherein the filter data includes at least an amount to be spent.

10. A computerized method for providing stop location recommendations comprising:
collecting, from a computing device of a user, context data indicating a location and travel path of the user;
identifying, by a recommendation engine, a plurality of stop locations based on context data;
accessing, by the recommendation engine, transaction data wherein the transaction data is associated with one or more past financial transactions of the user, the past financial transactions being conducted using a payment card;
determining, by the recommendation engine, user preference data based on the accessed transaction data, the user preference data indicating stop location preferences of the user;
providing, by the recommendation engine, a recommendation of at least one stop location of the identified plurality of stop locations based on the user preference data; and
providing guidance including a travel path and a distance from the location of the user to the stop location thereby enabling the user to reach the stop location following the provided guidance.

11. The computerized method of claim 10, wherein the user preference data indicates at least one of a preferred brand of stop location, a preferred category of stop location, a preferred time period for stopping at a stop location, and a preferred region for stopping at a stop location.

12. The computerized method of claim 10, wherein the accessed transaction data further includes transaction data associated with the plurality of stop locations; and
wherein providing a recommendation of at least one stop location of the plurality of stop locations includes providing a recommendation of at least one stop location based further on the transaction data associated with the plurality of stop locations.

13. The computerized method of claim 12, further comprising determining, based on the transaction data associated with the plurality of stop locations, stop location operating data including at least one of open hours data of the plurality of stop locations, predicted busy time period data of the plurality of stop locations, or predicted wait time data of the plurality of stop locations; and
wherein providing a recommendation of at least one stop location includes providing a recommendation of at least one stop location further based on the determined stop location operating data.

14. The computerized method of claim 10, wherein the context data includes a travel path mapped to a destination location; and
wherein identifying the plurality of stop locations includes identifying stop locations that are within a defined distance of the travel path.

15. The computerized method of claim 10 further comprising: receiving stop timing data from the user, the stop timing data indicating a time period during which the user wants to stop; and
wherein identifying the plurality of stop locations includes identifying stop locations that are predicted to be reachable within the indicated time period based on the context data and the stop timing data.

16. One or more non-transitory computer storage media having computer-executable instructions for providing stop location recommendations that, upon execution by a processor, cause the processor to at least:
- collect, from a computing device of a user, context data indicating a location and travel path of the user;
- identify, by a recommendation engine, a plurality of stop locations based on context data;
- access, by the recommendation engine, transaction data, wherein the transaction data is associated with one or more past financial transactions of the user, the past financial transactions being conducted using a payment card;
- determine, by the recommendation engine, user preference data based on the accessed transaction data, the user preference data indicating stop location preferences of the user; and
- provide, by the recommendation engine, a recommendation of at least one stop location of the identified plurality of stop locations based on the user preference data,
and
- provide guidance including a travel path and a distance from the location of the user to the stop location thereby enabling the user to reach the stop location following the provided guidance.

17. The one or more non-transitory computer storage media of claim 16, wherein the user preference data indicates at least one of a preferred brand of stop location, a preferred category of stop location, a preferred time period for stopping at a stop location, and a preferred region for stopping at a stop location.

18. The one or more non-transitory computer storage media of claim 16, wherein the accessed transaction data further includes transaction data associated with the plurality of stop locations; and
- wherein providing a recommendation of at least one stop location of the plurality of stop locations includes providing a recommendation of at least one stop location based further on the transaction data associated with the plurality of stop locations.

19. The one or more non-transitory computer storage media of claim 18, the computer-executable instructions, upon execution by a processor, further causing the processor to determine, based on the transaction data associated with the plurality of stop locations, stop location operating data including at least one of open hours data of the plurality of stop locations, predicted busy time period data of the plurality of stop locations, or predicted wait time data of the plurality of stop locations; and
- wherein providing a recommendation of at least one stop location includes providing a recommendation of at least one stop location further based on the determined stop location operating data.

20. The one or more non-transitory computer storage media of claim 16, wherein the context data includes a travel path mapped to a destination location; and
- wherein identifying the plurality of stop locations includes identifying stop locations that are within a defined distance of the travel path.

* * * * *